US010674705B2

(12) United States Patent
Shafer

(10) Patent No.: US 10,674,705 B2
(45) Date of Patent: Jun. 9, 2020

(54) PASSIVE SOLAR FLOAT DEVICE FOR SOLAR HEATING OF STOCK WATERING FACILITIES

(71) Applicant: Braden Michael Louis Shafer, Grand Junction, CO (US)

(72) Inventor: Braden Michael Louis Shafer, Grand Junction, CO (US)

(*) Notice: Subject to any disclaimer, the term of this patent is extended or adjusted under 35 U.S.C. 154(b) by 213 days.

(21) Appl. No.: 15/972,446

(22) Filed: May 7, 2018

(65) Prior Publication Data

US 2018/0317450 A1 Nov. 8, 2018

Related U.S. Application Data

(60) Provisional application No. 62/502,828, filed on May 8, 2017.

(51) Int. Cl.
*A01K 7/02* (2006.01)
*F24S 20/70* (2018.01)
*A01K 7/04* (2006.01)
*F24S 10/17* (2018.01)

(52) U.S. Cl.
CPC ............. *A01K 7/027* (2013.01); *A01K 7/04* (2013.01); *F24S 10/17* (2018.05); *F24S 20/70* (2018.05)

(58) Field of Classification Search
CPC ............. A01K 7/027; A01K 7/04; A01K 7/06
See application file for complete search history.

(56) References Cited

U.S. PATENT DOCUMENTS

| 4,108,156 | A | * | 8/1978 | Sitter | A01K 7/027 126/567 |
|---|---|---|---|---|---|
| 4,518,281 | A | | 5/1985 | Coe | |
| 5,437,244 | A | | 8/1995 | Van Gilst | |
| 5,983,889 | A | * | 11/1999 | Thomas | F24H 1/0054 119/73 |
| 2006/0081190 | A1 | * | 4/2006 | Ames | A01K 7/025 119/73 |
| 2008/0047498 | A1 | * | 2/2008 | Hollyday | A01K 7/027 119/73 |

* cited by examiner

*Primary Examiner* — Monica L Williams
(74) *Attorney, Agent, or Firm* — Davis & Bujold PLLC; Michael J. Bujold

(57) ABSTRACT

A solar float device for use in a livestock watering facility to inhibit the freezing of water in a livestock watering facility. The solar float device having upper and lower shells that are connected to each other. The upper shell encloses an air space and the lower shell encloses a ballast space. A bulkhead is connected to the lower shell and separates the air and ballast spaces. A ballast material contained within the ballast space maintains the float device upright in the water and is thermally conductive for receiving and storing heat generated by the solar float device from solar radiation. An energy absorbing element contacts the lower shell and at least a portion is arranged either at or above the level of the water such that the energy absorbing element is exposed to the solar radiation for absorbing the solar radiation and converting the solar radiation into heat.

15 Claims, 5 Drawing Sheets

PASSIVE SOLAR FLOAT DEVICE FOR SOLAR HEATING OF STOCK WATERING FACILITIES

CROSS REFERENCE TO RELATED APPLICATIONS/PRIORITY

This application claims the benefit of U.S. Provisional Patent Application No. 62/502,828 filed on May 8, 2017, which is herein incorporated by reference in its entirety.

FIELD OF THE INVENTION

The present invention relates to a solar float device for use in a livestock watering facility to inhibit the freezing of water in the livestock watering facility.

BACKGROUND OF THE INVENTION

The raising of horses cattle, sheep, goats and other livestock typically requires that the animals be kept, fed and watered in outdoor areas for large parts of a year, such as, for example, open range, pasturage areas or barnyards or feed lots. This requires the provision of fresh, liquid water to the animals to insure their survival, growth and well-being, including the prevention of disease and the provision of proper nutrition. Such water is typically provided to the animals by means of stock watering facilities including, for example, stock water tanks, automatic livestock waterers or various forms of reservoirs or ponds.

A recurring and severe problem in providing such water to livestock is in keeping the water from freezing, particularly in the cooler and cold seasons and environments, that is, early spring and late fall and in some instances in winter or even in summer at higher altitudes. This problem is compounded because the livestock need easy and direct access to the water, so that the tops of the tanks, the ponds and other forms of reservoir, are open to the winter air and suffer significant heat loss due to conduction, convection, and evaporation.

The systems and methods of the prior art to prevent freezing of livestock water range from recirculating pumps to keep the water moving to heating elements to directly heat the water above the freezing point. Keeping water moving, however, such as with recirculating pumps, is only successful down to temperatures near or slightly below freezing, and if temperatures fall below 15-20 degrees Fahrenheit, dependent upon wind chill and other factors, recirculating devices are inadequate. Therefore, most stock tank freezing prevention systems and methods rely upon direct heating of the water by means of electrically or fossil fuel powered thermostatically controlled heating devices immersed in the water. Some de-icers are floating, some are mounted on the bottom of the tank or reservoir or pond, and some are located somewhere between the surface and the bottom of the water, but all, whether electrically powered or powered, for example, by propane or natural gas, consume large amounts of power and are correspondingly expensive to operate. Electric tank de-icers, for example, are effective and reliable, but can cost several hundred dollars a month to operate. In addition, the use of electrical or other fossil fuel powered heating elements is environmentally detrimental and results in a significant carbon footprint.

Other methods of the prior art have attempted to at least alleviate the above discussed problems. For example, various designs of proprietary watering devices have a smaller water access opening, thereby reducing the amount and area of water exposed to the environment. Another device provides a cover over the entire surface of the water wherein the cover has one or more openings, each covered by a floating element, so that any one of the floating elements may be pushed down by an animal to allow access to the water therebeneath, as illustrated U.S. Pat. Nos. 5,437,244, and 4,518,281. Such methods, however, are mechanically complex and correspondingly expensive, with resulting losses in reliability, and are unsuited for use with many animals, a number of which, for example, inherently will not or cannot operate a mechanism to gain access to water.

SUMMARY OF THE INVENTION

Wherefore, it is an object of the present invention to overcome the above mentioned shortcomings and drawbacks associated with the prior art.

The present invention is directed to the solar float device for use in a livestock watering facility to inhibit the freezing of water in the livestock watering facility.

The solar float device of the present invention includes an upper shell transparent to radiated solar energy and a heat storing and conducting and storing lower shell wherein the upper shell and lower shell are thermally conductively connected with the upper shell defining and enclosing an air space and the lower shell defining and enclosing a ballast space with the air space and the ballast space being separated by a horizontal bulkhead located between the upper and lower shells. The ballast space contains a ballast material maintaining the solar float device in an upright floating orientation with the upper shell exposed to solar radiation and the lower shell submerged in the water of the stock watering facility. The ballast material is thermally conductively connected with at least the lower shell for receiving and storing heat generated by the solar float device from received solar radiation and redistributing the heat to the water through the lower shell. The solar float device further includes an energy absorbing element exposed to solar radiation for absorbing received solar radiation and converting the received solar radiation into heat, the energy absorbing element the thermally conductively connected to at least the lower shell.

The present invention also relates to a solar float device for use in a livestock watering facility to inhibit the freezing of water in a livestock watering facility. The solar float device comprises an upper shell and a lower shell that are connected to each other. The upper shell defines and encloses an air space and the lower shell defines and encloses a ballast space. A bulkhead is connected to the lower shell and separates the air space and the ballast space. A ballast material is contained within the ballast space and is in contact with the lower shell. The ballast material maintains the solar float device in an upright floating orientation in the water of the stock watering facility. In the upright floating orientation of the solar float device, the upper shell is oriented in an upward direction relative to a level of the water, and the lower shell is oriented in a downward direction relative to the level of the water. The ballast material is thermally conductive for receiving and storing heat generated by the solar float device from solar radiation. An energy absorbing element contacts at least the lower shell and is arranged on the solar float device such that, in the upright floating orientation of the solar float device, at least a portion of the energy absorbing element is arranged either at or above the level of the water such that the energy absorbing element is exposed to the solar radiation for absorbing the solar radiation and converting the solar radiation into heat.

The present invention also relates to a solar float device for use in a livestock watering facility to inhibit freezing of water within the livestock watering facility. The solar float device comprises an upper shell that is transparent to radiated solar energy, and a heat storing and conducting lower shell. The upper shell and the lower shell are thermally conductively connected. The upper shell defines and encloses an air space and the lower shell defines and encloses a ballast space. The ballast space contains a ballast material which maintains the solar float device, relative to a level of the water, in a vertically upright floating orientation when the solar float device is located in the water within the livestock watering facility. In the upright floating orientation of the solar float device, the upper shell is oriented in an upward direction relative to a level of the water and is at least partially exposed to solar radiation and the lower shell is oriented in a downward direction relative to the level of the water and is at least partially submerged in the water of the stock watering facility. The ballast material is thermally conductively connected with at least the lower shell for receiving and storing heat generated by the solar float device from received solar radiation. A horizontal bulkhead is located between the upper shell and the lower shell and separates the air space and the ballast space. An energy absorbing element is exposed to the solar radiation for absorbing the received solar radiation and converting the received solar radiation into heat, and the energy absorbing element is thermally conductively connected to at least the lower shell.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

Figure 1B:
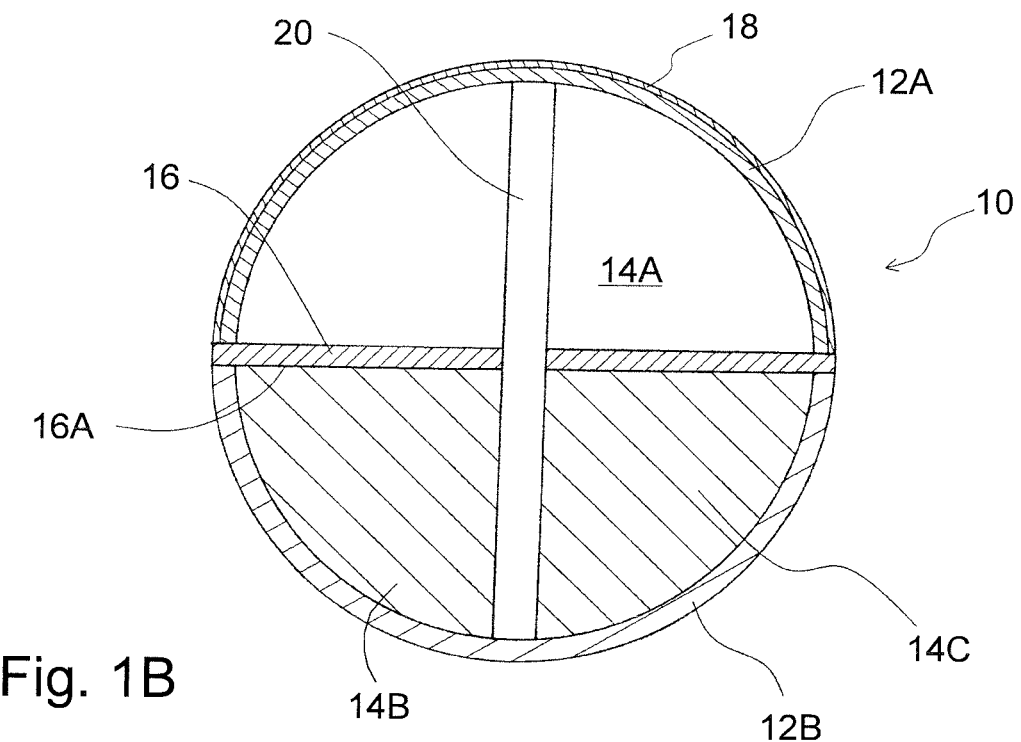
FIG. 1B shows a basic spherical embodiment of a solar float device.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention. It is to be further appreciated that section lines in the sectional views are intended to merely differentiate the different elements shown in the drawing. That is to say in other words, the section lines are not to specify or identify the material from which the elements are made.

Figure 1A:
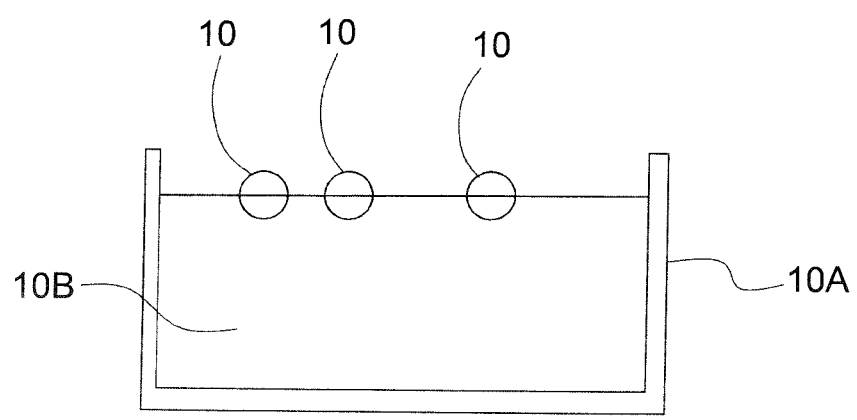
FIG. 1A shows the employment of a plurality of solar float devices in a stock watering facility.

Turning now to FIG. 1A, a brief description concerning the various components of the present invention will now be briefly discussed. As can be seen in this embodiment, the present invention includes one or more free floating solar float devices 10 for solar heating of water 10B contained within stock watering facilities 10A, such as a stock water tanks, automatic livestock waterer, reservoir or pond.

Referring to FIGS. 1A-1F, therein are illustrated various embodiments of a passive solar float device 10. As shown therein, a float device 10 of the present invention comprises of an upper shell 12A and a lower shell 12B, with the lower shell 12B preferably comprised of a heat conductive and storing material such as copper, aluminum, stainless steel, brass or conductive epoxy, plastic or resin. The material forming the upper shell 12A generally depends upon the specific embodiment of the solar float device 10, as will be described in the following. The upper shell 12A and lower shell 12B are circumferentially joined, for example by epoxy or other adhesive and sealing material, such that upper shell 12A defines and encloses an air space 14A while the lower shell 12B defines and encloses a ballast space 14B containing a ballast material 14C which either partially or completely fills the ballast space 14B. The ballast material 14C serves to maintain the floating device 10 in an upright floating orientation in the water 10B of the stock watering facility 10A. In the upright orientation of the floating device 10, the upper shell 12A is oriented upwards at least substantially out of the water 10B and exposed to the atmosphere and solar energy of the sun and the lower shell 12B is oriented downward, submerged in the water 10B of the stock watering facility 10A. In addition, the ballast material 14C preferably comprises, for example, a heat conductive and storing material for storing heat energy such as a heat conductive epoxy, plastic or resin, metallic elements, or heat conductive foam of sufficient density to serve as ballast. Possible ballast materials 14C may also include various liquids, such as water or water with an anti-freeze component.

As further shown, air space 14A and ballast space 14B are separated by a horizontal bulkhead 16 comprised of a heat conductive and storing material, such as a thermal conductive epoxy, plastic or resin or metal as described above. The outer circumference of bulkhead 16 is in heat conductive contact with at least the lower shell 12B. The bulkhead 16 has a lower surface 16A which faces the ballast space 14B. In certain embodiments of the solar float device 10, depending upon the form and distribution of the ballast material 14C within the ballast space 14B, at least a portion, if not an entirety of the lower surface 16A of the bulkhead 16 is in direct heat conductive contact with ballast material 14C.

A solar float device 10 further includes an energy absorbing element 18 that is exposed to radiant solar energy, that is, to the sky, and that absorbs and converts received solar radiation into heat. As will be described below, energy absorbing element 18 is thermally connected to at least the lower shell 12B and, in certain embodiments of the solar float device 10, to thermally conductive bulkhead 16 and ballast material 14C, so that the heat generated in solar energy absorbing element 18 is conducted to and stored in the lower shell 12B, bulkhead 16 and ballast material 14C and consequently eventually conducted into the surrounding water 10B.

Lastly and as illustrated in FIG. 1B and in the following further implementations of the solar float device 10, the solar float device 10 may further include a vertical heat conducting element 20 that extends vertically from energy absorbing element 18 to the bottom region of lower shell 12B to enhance the transfer of heat energy from the energy absorbing element 18 to lower shell 12B and thus to water 10B.

Next considering energy absorbing element 18 in various embodiments of the solar float device 10, and referring first to FIG. 1B, in the embodiment of the solar float device 10 illustrated therein, energy absorbing element 18 is comprised of a solar radiant energy absorbent material, such as a flat black paint, epoxy, resin or other functionally equivalent material, such a copper, aluminum, steel or brass and may be treated in any of a number of ways well known in the relevant arts to increase the energy absorbent properties of the elements, such as black paint, anodizing or surface roughing. The energy absorbing elements 18 may be bonded or mounted to the outer surface of upper shell 12A to receive solar energy and to conduct the resulting heat energy to upper shell 12A, which may comprise, for example, copper, aluminum, steel, brass or thermally conductive epoxy, plastic or resin, and to bulkhead 16, lower shell 12B and ballast material 14C. The heat energy is then conducted from upper shell 12A to bulkhead 16, lower shell 12B and ballast material 14C and eventually thereby to water 10B.

In the embodiment of the solar float device 10 illustrated in FIG. 1B, therefore, the vertical heat conducting element 20 extends from the top of upper shell 12A, where it is in thermally conductive connection with the energy absorbing element 18, to the bottom of lower shell 12B.

Figure 1C:
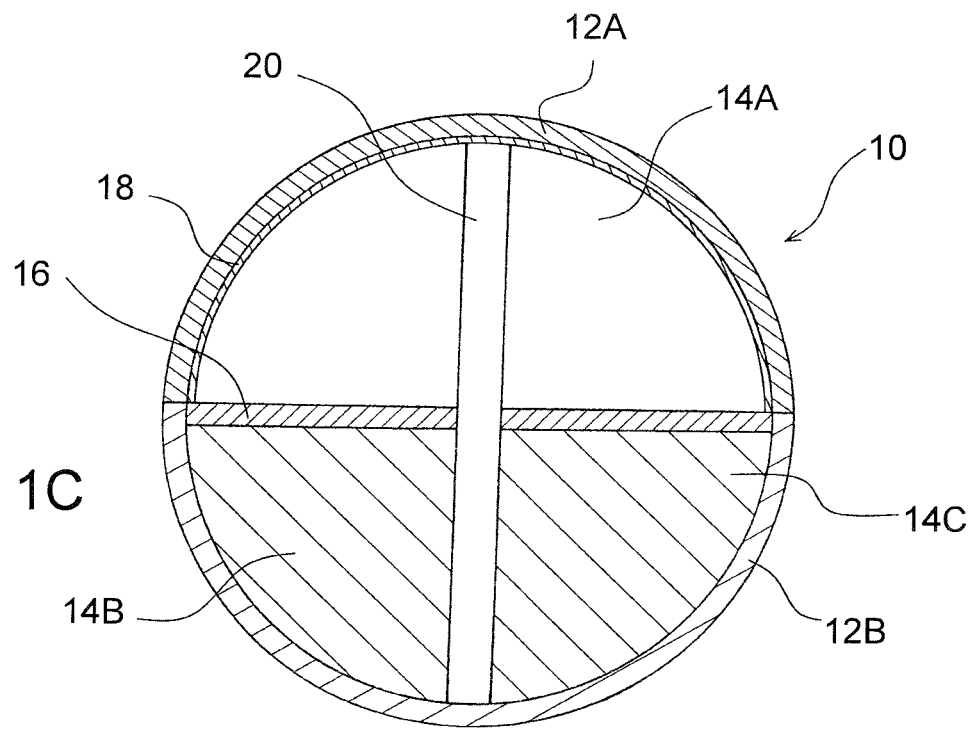
FIGS. 1C, 1D, 1E and 1F show further aspects of further embodiments of a solar float device.

In the embodiment illustrated in FIG. 1C, energy absorbing element 18 comprises a solar radiant energy absorbent material, such as a flat black paint, epoxy, resin or other functionally equivalent material bonded to the inner surface of upper shell 12A to receive solar energy and to conduct the resulting heat energy to lower shell 12B, bulkhead 16 and ballast material 14C and thereby to water 10B. In this embodiment, upper shell 12A, comprises a material which is transparent to radiant solar energy, thereby allowing the received solar energy to be received and absorbed by the energy absorbing element 18. The material of the upper shell 12A can be for example a clear plastic, epoxy, resin or glass, and is preferably heat conducting.

In the embodiment of the solar float device 10 illustrated in FIG. 1C, therefore, the vertical heat conducting element 20 again extends from the top of upper shell 12A, where it is in thermally conductive connection with the energy absorbing element 18, to the bottom of lower shell 12B.

Figure 1D:
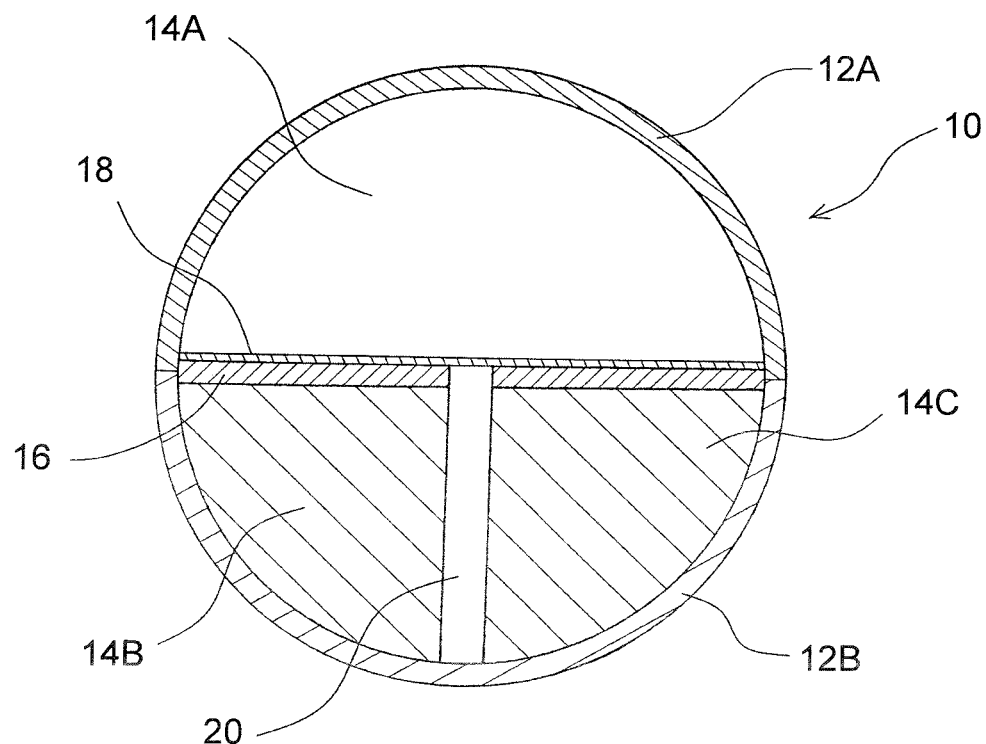

Referring to FIG. 1D, the embodiment illustrated therein is generally similar to that illustrated in FIG. 1C, except that the energy absorbing element 18 is mounted onto or bonded onto the upper surface of bulkhead 16, so that the heat energy generated by the received solar energy is transmitted from bulkhead 16 to lower shell 12B and ballast material 14C and thereby to water 10B.

In the embodiment of the solar float device 10 illustrated in FIG. 1D, therefore, the vertical heat conducting element 20 extends from bulkhead 16, where it is in thermally conductive connection with the energy absorbing element 18, to the bottom of lower shell 12B.

Figure 1E:
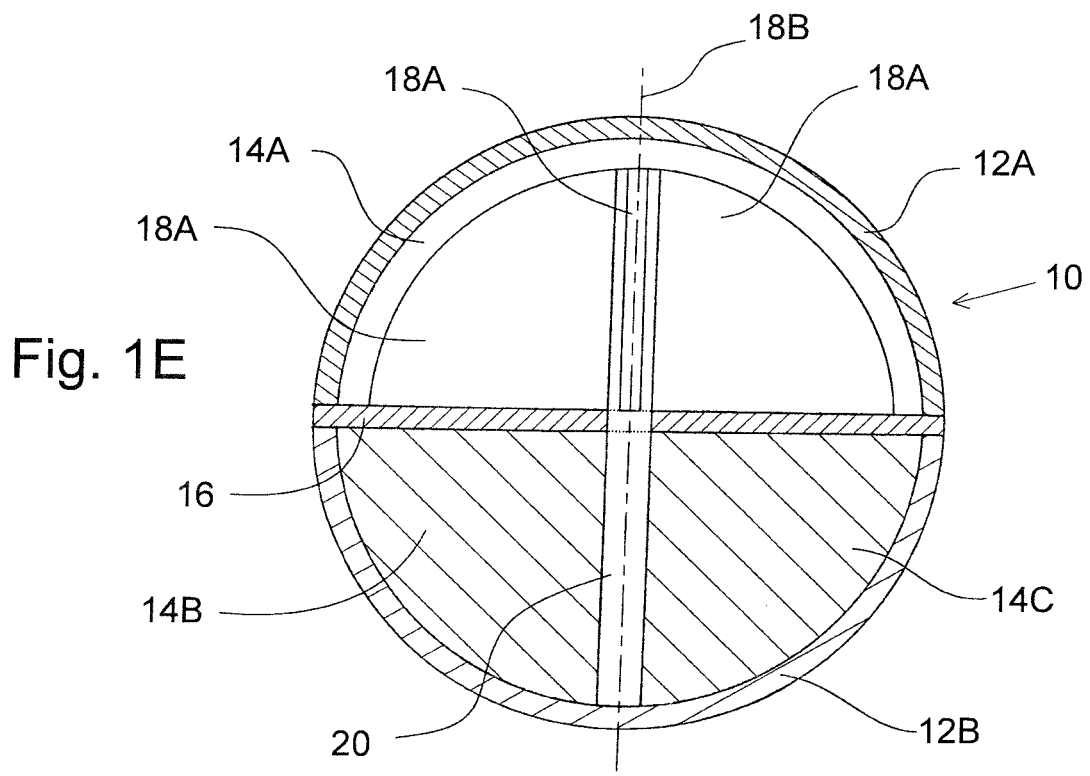
Figure 1F:
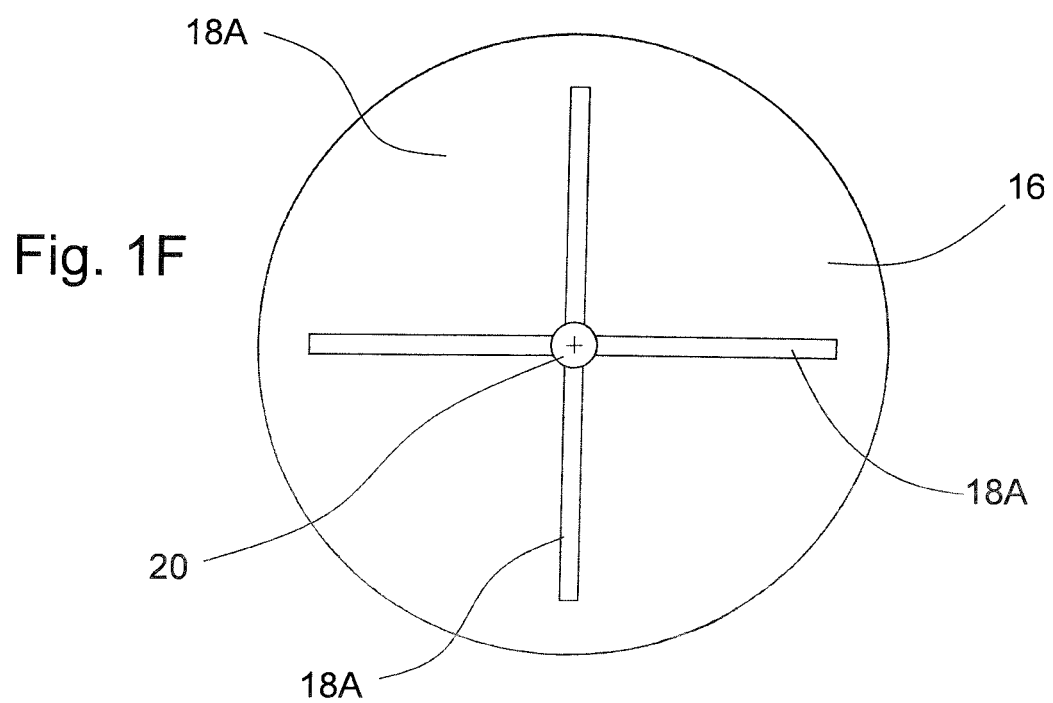

Referring now to the embodiment of the solar float device 10 illustrated in FIGS. 1E and 1F, as illustrated therein the energy absorbing element 18 comprises a plurality of energy absorbent fin elements 18A extending vertically from bulkhead 16 and radially outwards from a vertical center axis 18B of the solar float device 10 to present a number of energy absorbing surfaces to solar energy, thereby increasing the heat absorbing capacity of the solar float device 10. While FIGS. 1E and 1F show energy absorbing element 18 as being comprised of four energy absorbant fin elements 18A, it will be apparent that in this embodiment of the solar float device 10 energy absorbant 18 may be comprised of a fewer number of energy absorbant fin elements 18A, such as three, or a greater number such as six, eight or more. It will also be apparent that while the energy absorbant fin elements 18A illustrated in FIGS. 1E and 1F have the approximate shape of a quarter circle, other shapes such as rectangular fins 18A, are possible, such as rectangular elements 18A or fin elements 18A comprised of a mesh or lattice material.

Again, energy absorbant fin elements 18A may be comprised, for example, of copper, aluminum, steel, brass or thermally conductive epoxy, plastic or resin, in either solid or mesh or lattice form, and may be treated in any of a number of ways well known in the relevant arts to increase the energy absorbant properties of the elements, such a black paint, anodizing or surface roughing.

It must be noted that energy absorbant fin elements 18A may be mounted to, bonded to or molded or cast or otherwise formed as part of bulkhead 16. In a like manner, energy absorbant fin elements 18A may be mounted to, bonded to or molded or cast or otherwise formed as part of a vertical heat conducting element 20.

Figure 1G:
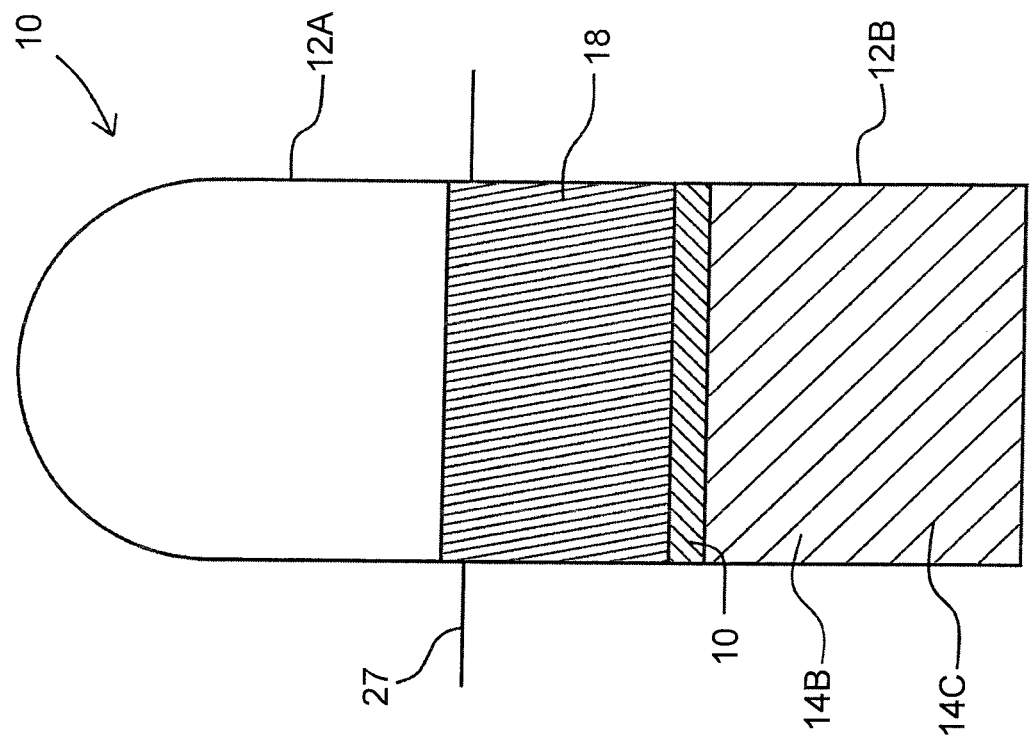
FIG. 1G shows a cylindrical embodiment of a solar float device.

Referring next to FIG. 1G, therein is shown a further embodiment of the solar float device 10 of the present invention wherein the general shape of the solar float device 10 is cylindrical rather then spherical. As illustrated therein, upper shell 12A is essentially a dome transparent to radiant solar energy, as described herein above, and may be, for example, a cylindrical dome with, for example, a hemispherical dome top, or hemispherical dome directly meeting lower shell 12B. In this embodiment, lower shell 12B is generally cylindrical in shape but is otherwise constructed as described above with a ballast space 14B holding a ballast material 14C. It will be noted, however, that in this embodiment bulkhead 16 and thus the top of ballast compartment 14B are not located at the junction of lower shell 12B with upper shell 12A, but are located displaced downwards in lower shell 12B from the junction of lower shell 12B with upper shell 12A. As illustrated, energy absorbing element 18 is located in the region of lower shell 12B between bulkhead 16 and the junction of lower shell 12B with upper shell 12A. Much of the energy absorbing element being located below the level of the water 27. The energy absorbing element 18, again, comprises a solar radiant energy absorbent material mounted or bonded to or coating the inner surface of the region of lower shell 12B between bulkhead 16 and the junction of lower shell 12B with upper shell 12A, such as a flat black paint, epoxy, resin or other functionally equivalent material, such a copper, aluminum, steel or brass and may be treated in any of a number of ways well known in the relevant arts to increase the energy absorbent properties of the elements, such a black paint, anodizing or surface roughing, or the use of fin elements or a mesh material.

It will be understood by those of ordinary skill in the relevant arts that upper and lower shells 12A and 12B may be formed in shapes other than those illustrated herein above. For example, lower shell 12B may be formed as a downward extending conical shape or upper and lower shells 12A and 12B may be formed to comprise a generally "donut" shape or hollow ring with an inner opening providing livestock with access to an area of liquid water within the inner opening.

Figure 1J:
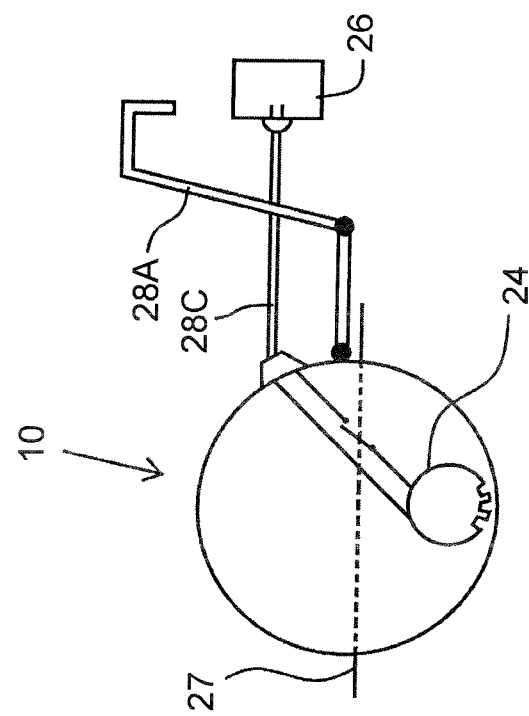
FIG. 1J shows a further embodiment of a solar float device with supplement power.
Figure 1H:
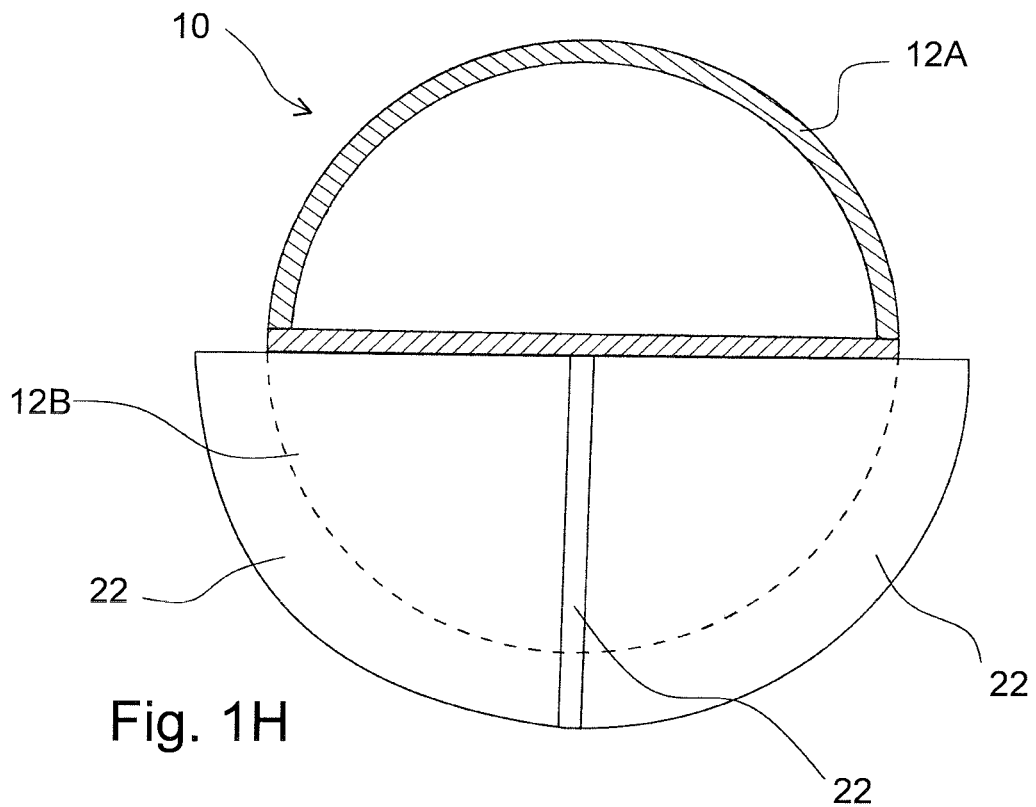
FIGS. 1H and 1I show a further embodiment of a solar float device.
Figure 1I:
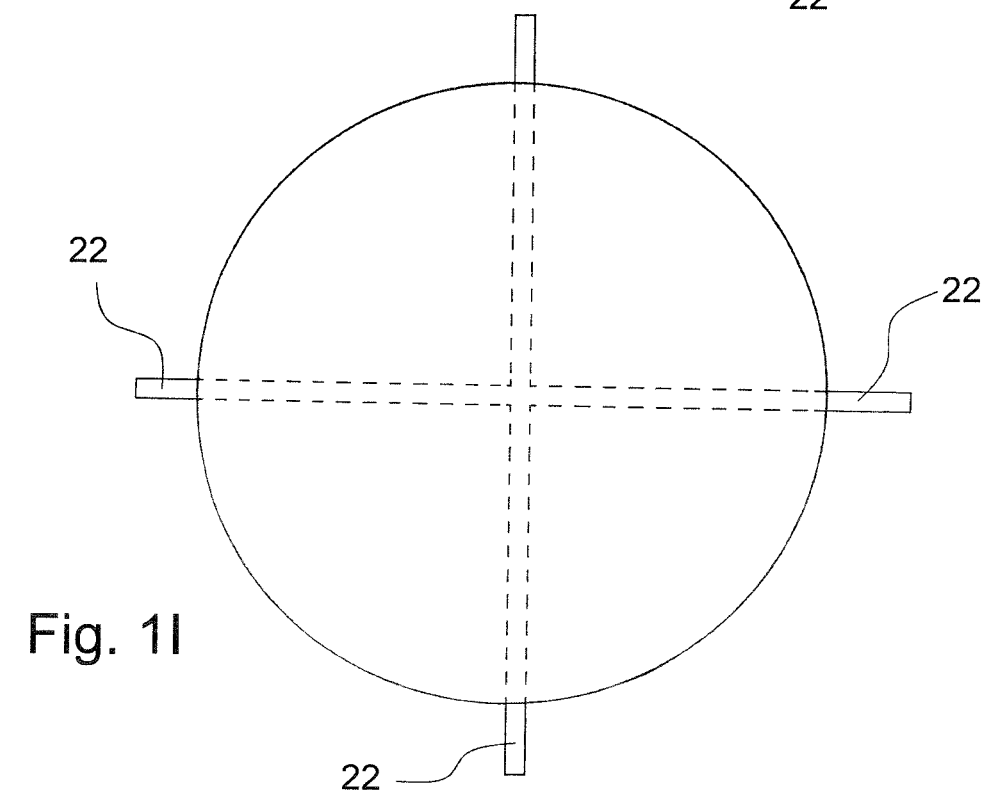

It will also be understood, by those of ordinary skill in the relevant arts, that, as illustrated in FIGS. 1H and 1I for the case of a spherical solar float device 10, lower shell 12B may be provided with a plurality of outwardly extending submerged thermally conducting fin elements 22 conductively connected with lower shell 12B to increase the rate of heat transfer from the solar float device 10 to the surrounding water 10B. It will be again understood that while FIGS. 1H and 1I show the solar float device 10 with four outwardly extending submerged thermally conducting fin elements 22, the solar float device 10 may be embodied with more or less fin elements 22. It will also be understood that fin elements 22 may be mounted or bonded to lower shell 12B or may be, for example, formed integrally with lower shell 12B.

Lastly with regard to exemplary embodiments of the solar float device 10, and as illustrated in FIG. 1J, the solar float device 10 may further include a thermostatically controlled heating element 24 connected from a power source 26 external to the stock watering facilities 10A. In this embodiment, thermostatically controlled heating element 24 would, for example, supplement the solar heating of water 10B during periods of low sunlight, that is, clouds or shadow, or periods of lower temperatures, or may extend the seasonal periods in which solar float devices 10 may be usefully employed. As indicated, the solar float device 10 may be connected or tethered to the stock watering facility 10A by means of a pivoting arm 28A or by a power cable 28C.

The number of solar float devices 10 employed in a given stock watering facility 10A and the sizes of the individual solar float devices 10 will typically both be scaled to the size of the stock watering facility 10A for example, the solar float device 10 may range between a few inches and 24 inches in diameter, although larger and smaller solar float devices may be employed, depending upon the particular circumstances.

Lastly, it must be noted that because solar float devices 10 are free floating, or at most loosely tethered by a pivoting arm 28A or cable 28C, there will typically be areas of open water for access by livestock, or that livestock will be able to access the water merely by pushing the solar float devices 10 out of the way with their noses, head or feet. Livestock will therefore not be required to actuate some form of mechanism in order to access the water. In addition, and in contrast to other systems of the prior art that require the water to be covered, an added benefit of solar float devices 10 is the reduction of algae growth from omission of solar energy directly entering the water and fueling algae growth, the solar energy being reduced by being captured and converted into heat by the solar float devices 10. In addition, and because solar float devices 10 do not prevent oxygen from entering the water surface, pathogen growth in the water supply is controlled.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

I claim:

1. A solar float device for use in a livestock watering facility to inhibit the freezing of water in a livestock watering facility, the solar float device comprising:
    an upper shell and a lower shell, the upper and the lower shells being connected to each other, the upper shell defining and enclosing an air space and the lower shell defining and enclosing a ballast space;
    a bulkhead being connected to the lower shell and separating the air space and the ballast space;
    a ballast material being contained within the ballast space and in contact with the lower shell, the ballast material maintaining the solar float device in an upright floating orientation in the water of the livestock watering facility, and in the upright floating orientation of the solar float device, the upper shell is oriented in an upward direction relative to a level of the water, and the lower shell is oriented in a downward direction relative to the level of the water, the ballast material being thermally conductive for receiving and storing heat generated by the solar float device from solar radiation, and
    an energy absorbing element contacting at least the lower shell and being arranged on the solar float device such that, in the upright floating orientation of the solar float device, at least a portion of the energy absorbing element is arranged either at or above the level of the water such that the energy absorbing element is exposed to the solar radiation for absorbing the solar radiation and converting the solar radiation into heat.

2. The solar float device according to claim 1, further comprising a heat conducting element defines an axis and extends through the bulkhead and extending into the ballast space, the heat conducting element contacting the ballast material contained within the ballast space and conducting heat from the air space to the ballast material and the lower shell.

3. The solar float device according to claim 2, wherein the energy absorbing element covers an outer surface of the upper shell and contacts a circumference of the bulkhead, the energy absorbing element converting the solar radiation into heat which is conducted to the ballast material by the heat conducting element.

4. The solar float device according to claim 3, wherein an upper axial end of the heat conducting element contacts an inner surface of the upper shell and axially extends through the air space and the bulkhead and contacts the ballast material such that the heat within the air space is conducted to the ballast material.

5. The solar float device according to claim 2, wherein the energy absorbing element covers an inner surface of the upper shell and contacts a circumference of the bulkhead, the energy absorbing element converting the solar radiation into heat which is conducted to the ballast material by the heat conducting element.

6. The solar float device according to claim 5, wherein an upper axial end of the heat conducting element directly contacts the energy absorbing element and axially extends through the air space and the bulkhead and contacts the ballast material such that the heat converted by the energy absorbing element and heat within the air space is conducted to the ballast material.

7. The solar float device according to claim 2, wherein the energy absorbing element covers an upper surface of the bulkhead, one axial end of the energy absorbing element contacts the energy absorbing element and conducts the heat converted by the energy absorbing element to the ballast material.

8. The solar float device according to claim 2, wherein the energy absorbing comprises a plurality of fins which are arranged within the air space and supported on an upper surface of the bulkhead, the plurality of fins mating with an axial extension of the heat conducting element such that the heat converted by the fins of the energy absorbing element and heat within the air space is conducted to the ballast material.

9. The solar float device according to claim 2, wherein the ballast material contacting a lower surface of the bulkhead and the heat conducting element, the ballast material receiving and storing the heat generated by the solar float device from the solar radiation, and the ballast material facilitating warming of the water in contact with the lower shell.

10. The solar float device according to claim 1, wherein a perimeter edge of the upper shell is connected to a perimeter edge of the lower shell and the upper shell is as least partially transparent to the solar radiation.

11. The solar float device according to claim 1, wherein each of the upper and the lower shells being semi-spherical and having inner and outer surfaces and an annular surface, and the annular surface of the upper shell abutting at least one of the annular surface of the lower shell and the bulk head.

12. The solar float device according to claim 11, wherein the annular surface of the upper shell mates with an upper surface of the bulkhead such that the air space is enclosed within the upper shell, and the annular surface of the lower shell mates with a lower surface of the bulkhead.

13. The solar float device according to claim 11, wherein the annular surface of the upper shell mates with the annular surface of the lower shell, and an outer circumference of the bulkhead mates with the inner surface of at least one of the upper and the lower shells.

14. A solar float device for use in a livestock watering facility to inhibit freezing of water within the livestock watering facility, the solar float device comprising:
an upper shell being transparent to radiated solar energy;
a heat storing and conducting lower shell;
the upper shell and the lower shell being thermally conductively connected, the upper shell defining and enclosing an air space and the lower shell defining and enclosing a ballast space;
the ballast space containing a ballast material, the ballast material maintaining the solar float device, relative to a level of the water, in a vertically upright floating orientation when the solar float device is located in the water within the livestock watering facility, in the upright floating orientation of the solar float device the upper shell is oriented in an upward direction relative to a level of the water and is at least partially exposed to solar radiation and the lower shell is oriented in a downward direction relative to the level of the water and is at least partially submerged in the water of the livestock watering facility, and the ballast material being thermally conductively connected with at least the lower shell for receiving and storing heat generated by the solar float device from received solar radiation;
a horizontal bulkhead located between the upper shell and the lower shell and separating the air space and the ballast space; and
an energy absorbing element being exposed to the solar radiation for absorbing the received solar radiation and converting the received solar radiation into heat, the energy absorbing element being thermally conductively connected to at least the lower shell.

15. The solar float device according to claim 14, further comprising a heat conducting element which defines an axis, the heat conducting element extending axially from within the ballast space and through the bulkhead, the heat conducting element contacting the ballast material contained within the ballast space and conducting heat from the air space to the ballast material and the lower shell.

* * * * *